US010000296B2

(12) United States Patent
Seger et al.

(10) Patent No.: US 10,000,296 B2
(45) Date of Patent: Jun. 19, 2018

(54) ELECTRICAL CONTROL SYSTEM

(71) Applicant: Hamilton Sundstrand Corporation, Charlotte, NC (US)

(72) Inventors: Mark J. Seger, Rockford, IL (US); Wes Ralph, Rockford, IL (US); Lon R. Hoegberg, Belvidere, IL (US); Robert A. Bayles, Belvidere, IL (US); Sunil S. Patel, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 542 days.

(21) Appl. No.: 14/624,877

(22) Filed: Feb. 18, 2015

(65) Prior Publication Data

US 2016/0355275 A1 Dec. 8, 2016

(51) Int. Cl.

| | |
|---|---|
| ***B64D 41/00*** | (2006.01) |
| ***F02C 7/32*** | (2006.01) |
| ***H02P 9/48*** | (2006.01) |
| ***H02P 29/024*** | (2016.01) |
| ***F01D 15/10*** | (2006.01) |

(Continued)

(52) U.S. Cl.

CPC ............ *B64D 41/00* (2013.01); *F01D 15/10* (2013.01); *F02C 7/32* (2013.01); *H02P 9/48* (2013.01); *H02P 29/0241* (2016.02); *B64D 2221/00* (2013.01); *F05D 2220/323* (2013.01); *F05D 2220/76* (2013.01); *H02H 7/06* (2013.01); *H02P 2101/30* (2015.01)

(58) Field of Classification Search

CPC . B64D 41/00; B64D 2221/00; H02P 29/0241; H02P 9/48; H02P 2101/30; F01D 15/10; F02C 7/32; F05D 2220/323; H05D 2220/76; H02H 7/06

USPC ........... 307/8, 76, 9.1; 361/20–22, 93.1, 87; 290/40 B; 322/28–29

See application file for complete search history.

(56) References Cited

U.S. PATENT DOCUMENTS

| | | |
|---|---|---|
| 4,403,292 A | 8/1983 | Ejzak et al. |
| 4,446,417 A | 5/1984 | Fox et al. |
| 5,153,498 A | 10/1992 | Parro |

(Continued)

FOREIGN PATENT DOCUMENTS

WO 2014196981 A1 12/2014

OTHER PUBLICATIONS

European Search Report for European Application No. 16156284.8 dated Jul. 25, 2016.

*Primary Examiner* — Dinh T Le

(74) *Attorney, Agent, or Firm* — Carlson, Gaskey & Olds, P.C.

(57) ABSTRACT

An example aircraft electrical system includes a generator coupled with a gas turbine engine and a controller operable to distribute power of the generator. The controller includes a first control module positioned at a first location remote from the generator and a second control module positioned at a second location proximate the generator. The first control module is configured to verify at least one output of the generator, detect a fault condition of the generator, and control operation of at least one power bus in communication with the first control module. The second control module is configured to regulate the at least one output of the generator, where the at least one output includes a voltage. An example method of operating an electrical system is also disclosed.

11 Claims, 7 Drawing Sheets

(51) Int. Cl.
*H02H 7/06* (2006.01)
*H02P 101/30* (2015.01)

(56) References Cited

U.S. PATENT DOCUMENTS

| | | | |
|---|---|---|---|
| 5,325,043 A | | 6/1994 | Parro |
| 7,292,011 B2 * | | 11/2007 | Beneditz .............. H02H 1/0015 322/39 |
| 8,213,136 B2 * | | 7/2012 | Maddali .................... H02J 4/00 244/58 |
| 8,560,201 B2 | | 10/2013 | Morrow et al. |
| 8,928,166 B2 | | 6/2015 | Seger et al. |
| 9,071,051 B2 * | | 6/2015 | Sagona ................ H02H 7/1252 |
| 9,209,732 B2 * | | 12/2015 | Radan .................... B63H 23/24 |
| 9,634,490 B2 * | | 4/2017 | Pamulaparthy ....... H02J 3/1878 |
| 2008/0211237 A1 | | 8/2008 | Berenger |
| 2009/0045292 A1 | | 2/2009 | Maddali et al. |
| 2011/0295436 A1 | | 12/2011 | Haynes et al. |
| 2012/0232728 A1 | | 9/2012 | Karimi et al. |
| 2013/0154351 A1 | | 6/2013 | Seger et al. |

* cited by examiner

ELECTRICAL CONTROL SYSTEM

BACKGROUND

This disclosure relates to aircraft electrical systems, and more specifically to generator controls and bus controls for power and data distribution within an aircraft.

An aircraft can include one or more generators to power various systems in the aircraft. A generator control unit controls the output and operations of the generator. The generator control unit also functions to detect a variety of possible generator faults, such as an overvoltage condition, which could cause damage or a catastrophic loss to the aircraft. Additional power quality modules provide redundancy to the generator control unit's fault detection. Typically, each generator has a corresponding generator control unit and power quality module.

The aircraft electrical system also includes a number of power buses to distribute power from the generator and data buses for use with a variety of aircraft systems. A separate bus processing control unit controls these buses.

SUMMARY OF THE DISCLOSURE

According to an example aspect of this disclosure, an aircraft electrical system includes a generator coupled with a gas turbine engine and a controller operable to distribute power of the generator. The controller includes a first control module positioned at a first location remote from the generator and a second control module positioned at a second location proximate the generator. The first control module is configured to verify at least one output of the generator, detect a fault condition of the generator, and control operation of at least one power bus in communication with the first control module. The second control module is configured to regulate the at least one output of the generator, where the at least one output includes a voltage.

According to another example aspect of this disclosure, a method of operating an aircraft electrical system includes providing a generator coupled with a gas turbine engine and a controller including a control module and a second control module. The first control module verifies the output of the generator. The first control module is positioned at a first location remote from the generator. The first control module is operable to detect a fault condition of the generator. A second control module regulates the output of the generator. The second control module is positioned at a second location proximate the generator. The second output includes a voltage. The first control module controls operation of at least one power bus with the first control module.

DETAILED DESCRIPTION

Figure 1:
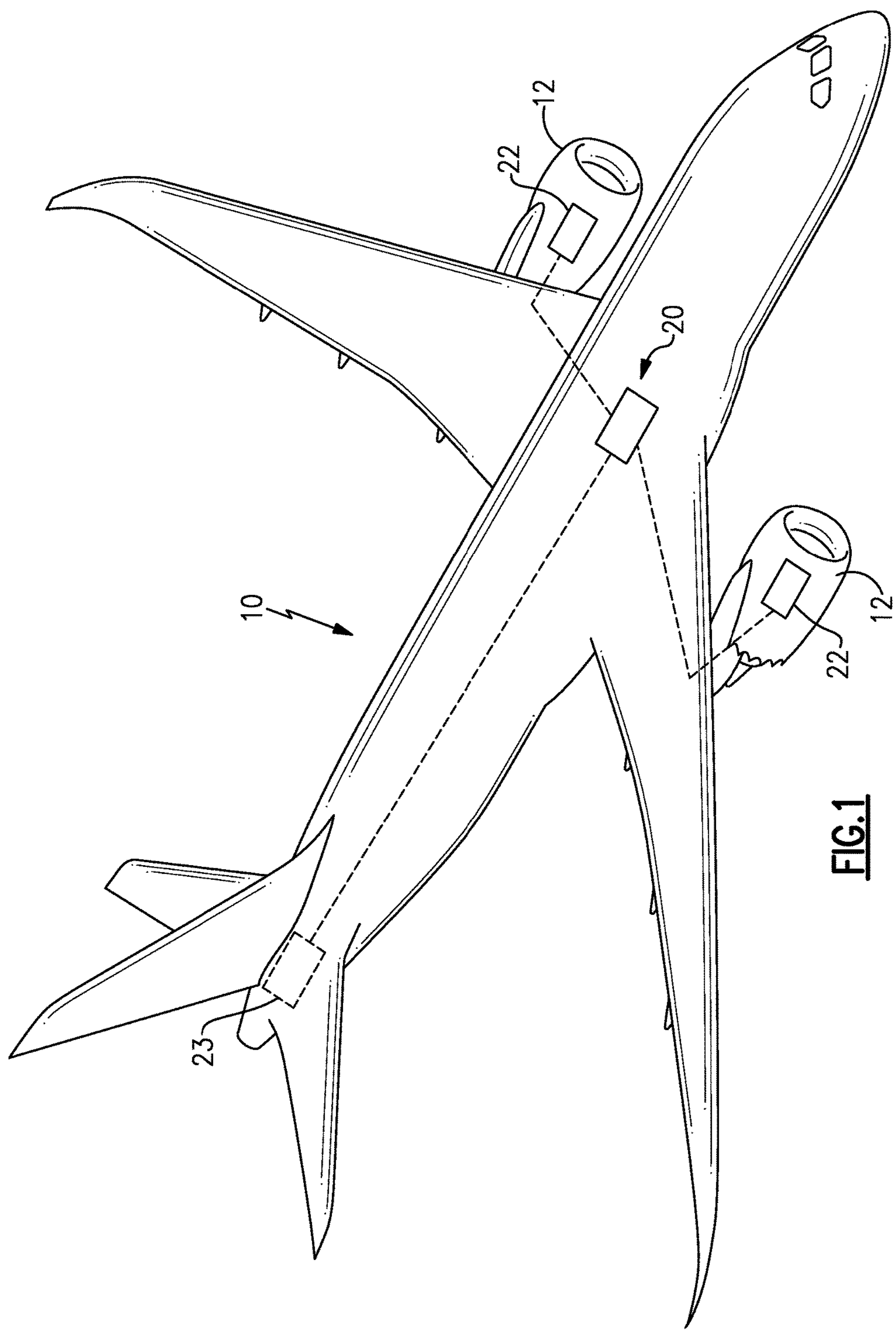
FIG. 1 illustrates an example aircraft with an electrical system.
Figure 2:
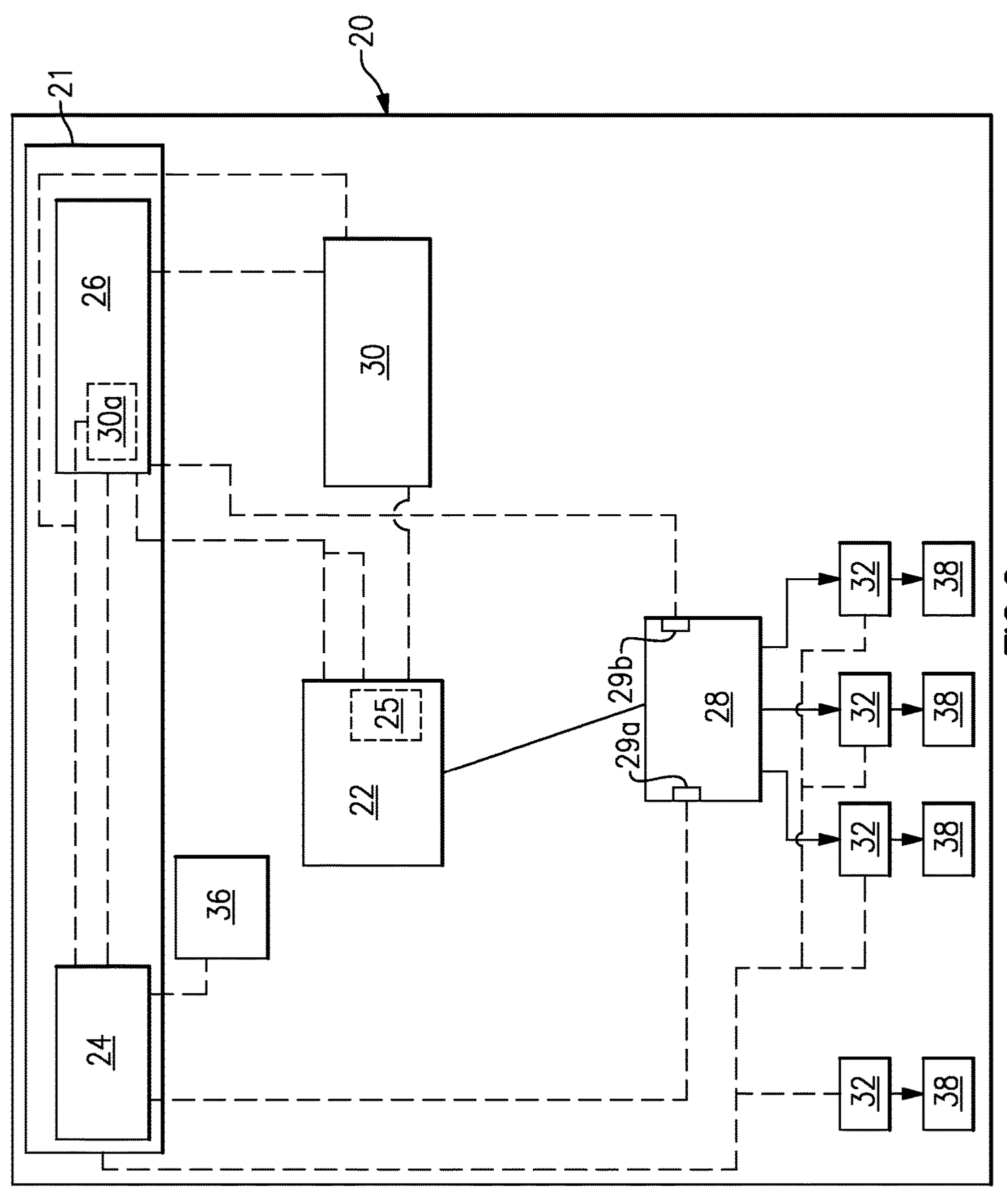
FIG. 2 illustrates a schematic view of an example electrical system.

Referring to FIGS. 1 and 2, an example aircraft 10 includes at least one gas turbine engine 12 and an electrical system 20. The electrical system 20, shown schematically, includes at least one generator 22 that is coupled to one of the gas turbine engines 12 and is driven by one of the gas turbine engines 12. In some examples, one of the generators 22 is an auxiliary power unit ("APU"), such as APU 23.

Controllers control, monitor, and verify the operation and interaction of components of the aircraft electrical system 20, and detect fault conditions in the system. Separate controls each with individual processors may be provided to control, monitor, and verify any of the generator 22, APU 23, power buses, data buses, and other electrical system components to detect fault conditions and control operation of these components. Independent fault detection may employ additional controls and processors to provide separate detection of fault conditions. The controllers may communicate with, and control, components of the aircraft electrical system at locations differing from the locations of the controllers.

In this regard, the electrical system 20 includes a controller 21, including a first control module 24 and a second control module 26 associated with each generator 22. In this example, the first control module 24 is a generator and bus control module ("GBCM"), and the second control module 26 is a voltage regulator ("VR"). The first control module 24 and the second control module 26 are in communication with the generator 22 and each other. The first control module 24 is also controls power buses 32 and an aircraft communications system 36, as will be described in further detail below.

The electrical system 20 includes a generator line control 28 and a generator control relay 30 that are operable to selectively isolate the generator 22 from other components of the aircraft 10 and electrical system 20. In one example, the generator line control 28 communicates with the generator 22, as well as the first control module 24 and the second control module 26. In one example, the generator control relay 30 communicates with the generator 22, as well as the first control module 24 and the second control module 26. Alternatively, the generator control relay **30*a* (shown in ghost) is within the second control module 26 and in communication with the generator 22**, as will be described in greater detail below.

The first control module 24 controls the distribution of power from the generator 22. The first control module 24 evaluates the health of the electrical system 20. For example, the first control module 24 monitors the output of the generator 22 and compares the output of the generator 22 to the loads found within portions of the electrical system 20. A fault condition may be indicated and detected when the sum of the loads in the electrical system 20 does not match the output of the generator 22. The first control module 24 monitors the output of the generator 22 to verify it is meeting aircraft 10 requirements. In one example, verification includes operating as a breaker control to ensure intended distribution and use of the generated voltage and current, detecting faults in the electrical system 20 that cause current to flow into a short circuit instead of to a load, monitoring the electrical system 20 at different locations to ensure power and data are being distributed in an intended amount and location, or detecting a fault condition, as described herein.

The first control module 24 communicates with a plurality of buses, such as power buses 32. The first control module 24 controls operation of the power buses 32 and the generator 22 by controlling inputs and outputs of the power buses 32 and the generator 22, monitoring and determining how the power buses 32 and the generator 22 are functioning, individually and within the electrical system 20, and providing fault protection for the power buses 32 and the generator 22. Such operation control includes, for example, determining which power buses 32 are critical such that power can be prioritized during a fault condition, whether power buses 32 are receiving and transmitting the correct information, transferring power between different generators 22 during various gas turbine engine 12 operating conditions, and monitoring generator 22 oil temperatures and oil pressure.

In one example, the first control module 24 controls power buses 32 associated with the generator 22, and also controls power buses 32 associated with other generators or components (not shown).

The first control module 24 provides fault protection determined in response to an architecture of the aircraft communication systems 36, electrical systems 20, and generators 22 specific to the aircraft 10. The first control module 24 may be interfaced with a plurality of additional first control modules 24, each associated with a different generator 22, such that the first control modules 24 can exchange status reports of aircraft systems and the electrical system 20, and when necessary, use redundant generators 22 as power sources in response to detecting a fault condition.

As will be described in further detail below, by using the first control module 24 to control the generator 22 and the power buses 32, fewer independent control modules and processors are used.

The first control module 24 and the second control module 26 communicate with each other. The first control module 24 is configured to instruct the second control module 26 to cause the generator 22 to output voltage and current, and instructs the distribution of such generator 22 output in the electrical system 20. The second control module 26 is configured to determine the amount of voltage and current the generator 22 produces. The second control module 26 regulates the generator 22 using a voltage regulator ("VR") processor that instructs an increase or decrease in an exciter drive (described below) output in response to the second control module 26 inputs, as further described below. The second control module 26 monitors the generator 22 output in a closed loop control. The second control module 26 monitors current near the generator 22 output location and voltage at the input location of the generator line control 28. The second control module 26 is configured to correct the amount of current or voltage the generator 22 outputs through control of the exciter drive.

The second control module 26 provides overcurrent protection, and monitors generator 22 voltage and current outputs to ensure the generator 22 providing the intended voltage and current. In one example, the second control module 26 enters a current limiting mode when the aircraft 10 suffers from a short circuit, or overcurrent, condition such that the second control module 26 instructs the generator 22 to output only a certain amount of current to limit or prevent any damage to the aircraft 10.

The second control module 26 communicates internal testing information to the first control module 24. That is, the second control module 26 reports the values for one or more parameters it measures to the first control module 24. These parameters may include, but are not limited to, current, voltage, frequency, generator speed, and generator temperature. The first control module 24 is able to determine when the electrical system 20 is working properly by comparing these values from the second control module 26 to other values the first control module 24 measured in its own monitoring and verification of the electrical system 20. In one example, the first control module 24 detects a fault condition or system error may have occurred when the parameter values do not match. The first control module 24 can take one or more steps to investigate a potential fault condition, prevent damage to the aircraft 10 and the electrical system 20, and redistribute power to the various loads 38 of the electrical system 20.

The first control module 24 and the second control module 26 provide independent fault protection against certain conditions that may occur within the electrical system 20. In one example, fault conditions include an overvoltage condition, an undervoltage condition, an overfrequency condition, or an underfrequency condition. In one example, the generator 22 provides power at a predetermined frequency of 400 Hz and a predetermined voltage of 115V. In another example, the fault condition is based on deviations from a predetermined frequency or voltage ranges or threshold. In some examples, a fault condition includes a malfunction of either of the first control module 24 and the second control module 26 that prevents normal operation. In one example, the fault condition occurs when a component of the electrical system 20 performs an operation without a command from either of the first control module 24 or the second control module 26.

The first control module 24 can take the second control module 26 offline when the second control module 26 is faulty, damaged, or otherwise inoperable. In one example, the term offline, as used in this disclosure, refers to the component being electrically isolated from other portions of the electrical system 20, no longer operable, or no longer used by the electrical system 20. In one example, the first control module 24 monitors the current and voltage provided by the second control module 26 and generator 22. When the current or voltage is incorrect, the first control module 24 takes one or both of the second control module 26 and generator 22 offline. In another example, the first control module 24 has a time delay before taking either of the second control module 26 or the generator 22 offline. The first control module 24 is able to electrically isolate the generator 22 from other portions of the electrical system 20 to prevent damage to the rest of the electrical system 20 or aircraft 10 in the event of a fault, damage, or malfunction in the generator 22 or the second control module 26.

The second control module 26 communicates with the generator 22 such that the second control module 26 may take the generator 22 offline through use of the exciter drive connected to the generator 22, as described in further detail below.

The generator line control 28 serves as a switch between the generator 22 and power buses 32, and associated loads 38, receiving power from the generator 22. The first control module 24 and the second control module 26 communicate with the generator line control 28. The first control module 24 drives a first terminal **29*a* of the generator line control 28 and the second control module 26 drives a second terminal 29*b* of the generator line control 28. Both the first control module 24 and the second control module 26 must be in an ON state for the generator line control 28 to allow power to pass from the generator 22 to the loads 38. In this way, either the first control module 24 or second control module 26 can take the generator 22 offline by switching to an OFF state in response to detecting a fault condition, preventing the generator line control 28 from communicating power from the generator 22**.

In one example, the first control module 24 will switch to an OFF state, opening the generator line control 28, in response to detecting a fault condition or malfunction in the second control module 26. In another example, the second control module 26 will switch to an OFF state, opening the generator line control 28, in response to detecting a fault condition or malfunction in the first control module 24. In one example, the first control module 24 will command the generator line control 28 to open in response to a different amount of change in a measured parameter, such as current, than the second control module 26. That is, the second control module 26 has a higher tolerance for error before changing to an OFF state and opening the generator line control 28 than the first control module 24.

In this example, the first control module 24 and the second control module 26 are in communication with the generator control relay 30. Alternatively, the generator control relay 30 may be in the second control module 26 and controlled by only the second control module 26, as will be described in further detail below.

The generator control relay 30 serves as a switch to take the generator 22 offline from the rest of the electrical system 20. The generator control relay 30 is arranged to receive power being provided to the exciter drive and intended for the generator 22 (as shown further in FIGS. 5 and 6). The first control module 24 and/or the second control module 26 communicates with the generator control relay 30 to command the generator control relay 30 to allow power to pass through the exciter drive 90 and to the generator 22. However, either of the first control module 24 and the second control module 26 may signal the generator control relay 30 to prevent the power from passing to the exciter drive from the second control module 26 to the generator 22, in response to detecting a fault condition, or to effectuate taking the generator offline.

In operation, the first control module 24 and the second control module 26 regulate and monitor the generator 22 output, while also providing independent fault detection, redundancy and control of the power bus 32 operations in the electrical system 20. The first control module 24 or the second control module 26 are able to isolate the generator 22 from the rest of the aircraft 10 and electrical system 20 in response to detecting a fault condition. The control modules 24, 26 are configured to electrically isolate the generator 22 through turning off the exciter drive 90 output, the generator line control 28, and the generator control relay 30. In one example, the first control module 24 or the second control module 26 are able to isolate the generator in response to detecting a fault condition or malfunction in either of the second control module 26 or first control module 24, respectively. The first control module 24 is able to control the power bus 32 operations during aircraft 10 operation and in response to detecting a fault condition. For example, the first control module 24 can determine which power buses 32 to use, instruct the power buses 32 where or what signals and information to transmit and distribute, monitor the power buses 32 to ensure normal operation of the electrical system 20, and prevent a power bus 32 from being used when a fault condition is detected. As a result, separate power quality modules are no longer needed, and fewer processors and printed wire boards are used (as described below). The method of operating the aircraft 10 and electrical system 20 includes any features described in this disclosure regarding the aircraft 10, electrical system 20, and any features thereof.

In one example, the generator 22 includes a constant speed drive 25 that controls the rotational speed of the generator 22 relative to the rotational speed of the at least one gas turbine engine 12. In this example, the constant speed drive 25 is integrated with the generator 22. However, other arrangements are contemplated. In the constant speed drive 25 example, the second module 26 communicates with the constant speed drive 25 to control the rotational speed of the generator 22 and to adjust the frequency of the generator 22 output. In one example, the second module 26 adjusts the constant speed drive 25 to match the rotational speed of the generator 22 to the rotational speed of another generator 22 driven by the at least one gas turbine engine 12.

Figure 3:
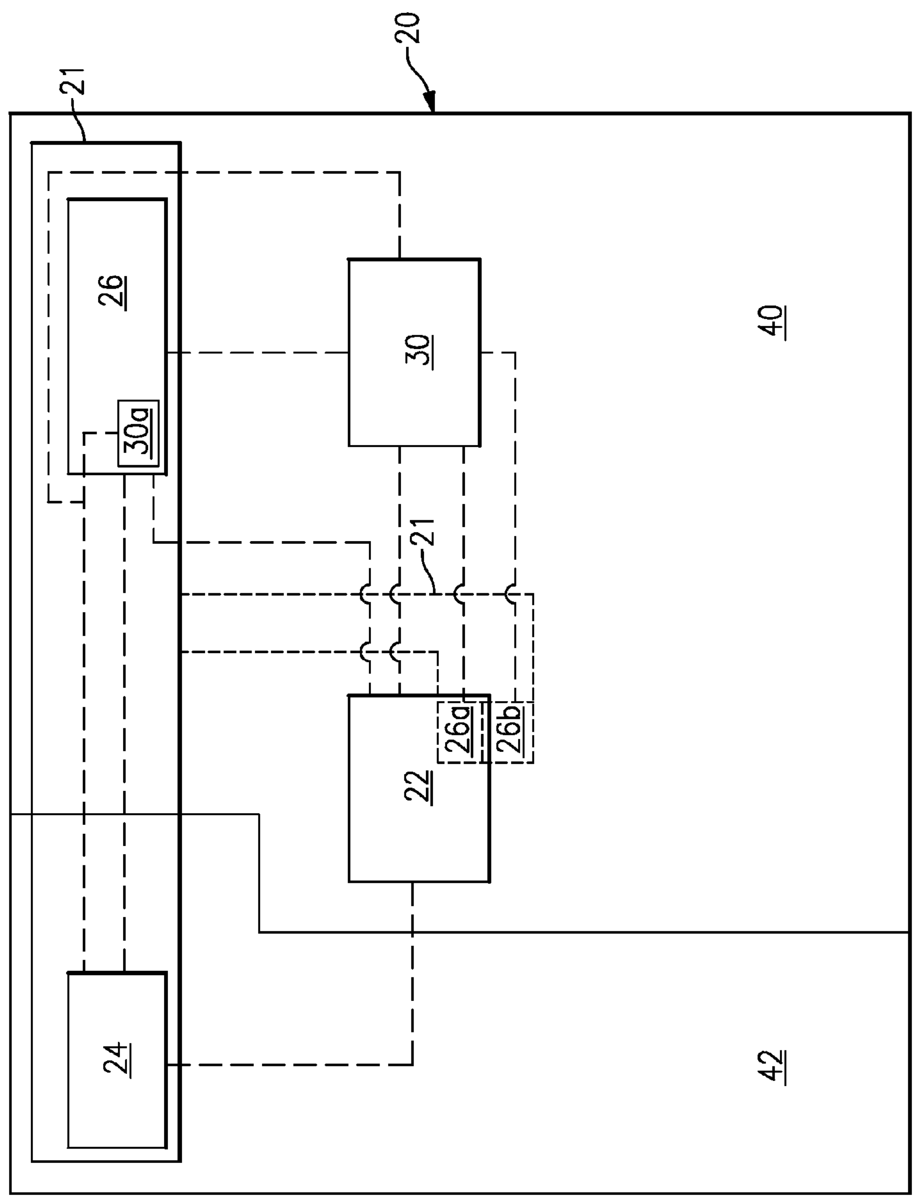
FIG. 3 illustrates another schematic view of selected portions of the example electrical system of FIG. 2.

Referring to FIG. 3, portions of the electrical system 20 and controller 21 of FIG. 2 are shown. In this example, the second control module 26 is located proximate to the generator 22 in a generator region 40 of the aircraft 10. In one example, the second control module 26 is in an unpressurized area of the generator region 40 proximate to the generator 22. The first control module 24 is remote from the second control module 26 and the generator 22, and is located in a body region 42 of the aircraft 10 a physical distance away from the generator region 40.

In this example, the second control module 26 is proximate to the generator 22 by being in the generator region 40. The second control module 26 may be proximate to the generator 22 by being within the generator 22, in part or in whole (as shown in ghost by 26*a*) or attached to the generator 22, by bolting or other mechanical means (as shown in ghost by 26*b*). In one example, the second control module 26 location reduces weight by reducing high voltage and high current aircraft 10 wiring used to connect the generator 22 with a remotely located controller 21. Moreover, the second control module 26 generates heat. When the second control module 26 is located in the generator region 40, heat in the body region 42 is reduced and the second control module 26 can access external cooling air.

In one example, the generator region 40 includes the gas turbine engine 12 and a portion of the wing of the aircraft 10 attached to the gas turbine engine 12. The body region 42 includes the fuselage of the aircraft 10. The first control module 24 and the second control module 26 can be located in other areas on the aircraft 10, depending on the structure and requirements of the aircraft 10 and electrical system 20.

Figure 4:
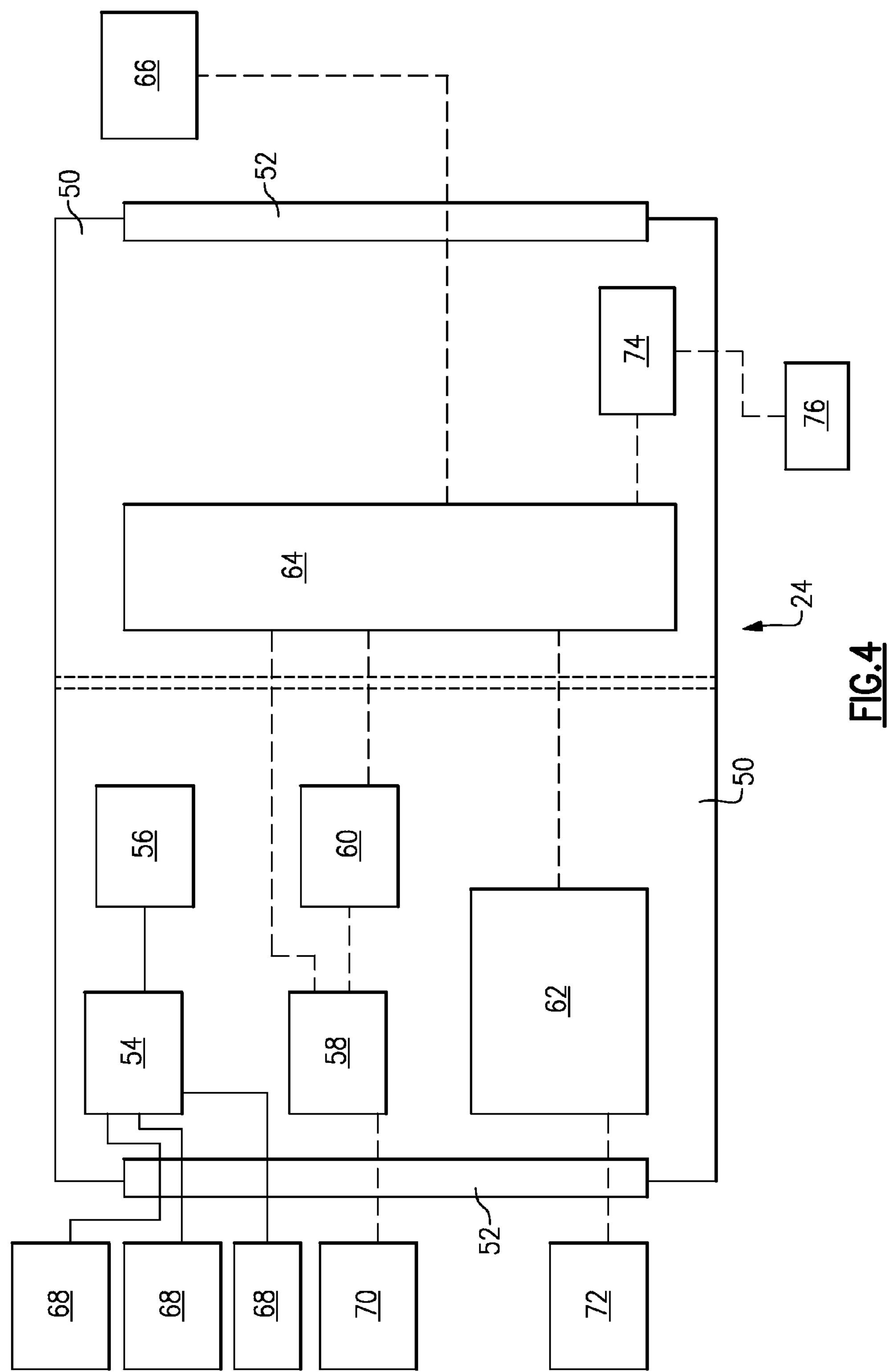
FIG. 4 illustrates a schematic view of an example first control module.

Referring to FIG. 4, with continued reference to FIG. 2, an example first control module 24, shown schematically, includes at least one printed wire board 50 and connectors 52 for receiving inputs and transmitting outputs. In one example, a single printed wire board 50 is used. In another example, two printed wire boards 50 are used and components of each printed wire board 50 communicate with each other.

The first control module 24 includes a diode-OR circuit 54 in communication with an integrated power system ("IPS") 56, an analog input filter 58 in communication with at least one signal processor 60 and a main GBCM processor 64, and a discrete input filter 62. The signal processor 60 and the discrete input filter 62 are in communication with the main GBCM processor 64 that controls the first control module 24 to provide electrical system 20 protections. Main GBCM processor 64 outputs signals from the first control module 24 to components and modules of the electrical system 20 through the connector 52. Main GBCM processor 64 also communicates with aircraft communications system 36.

In this example, at least one direct current ("DC") source 68 provides a DC input to power the first control module 24. The at least one DC source 68 is connected to the diode-OR circuit 54 through a connector 52 and provides voltage to the diode-OR circuit 54, which then processes and generates a current output. This current is then communicated to the IPS 56 to power the IPS 56. In one example, each of the at least one DC sources 68 provides a 28V input.

A plurality of analog devices 70 provide analog inputs that are received by the first control module 24 and communicated through the connector 52 to the analog input filter 58. The analog inputs are measurements of various system parameters monitored and sampled by the first control module 24 at different locations in the electrical system 20. For example, the analog devices 70 provide analog inputs including measurements of frequency, generator speed, voltage, temperature, or other parameters of the electrical system 20 and generator 22.

The analog input filter 58 is configured to filter and scale the analog inputs, and communicates the analog inputs to the signal processor 60. Although one signal processor is shown, it is contemplated to use a plurality of signal processors 60 in communication with the analog input filter 58. The signal processor 60 is configured to evaluate and convert the analog inputs to digital inputs before communicating the digital inputs to the main GBCM processor 64. The signal processor 60 performs high bandwidth evaluation and conversion of the analog inputs, thereby reducing the work load of the main GBCM processor 64 and freeing the main GBCM processor 64 for other tasks. Although a single main GBCM processor 64 is shown, additional processors can be utilized.

In one example, the analog input filter 58 communicates directly with the main GBCM processor 64 to evaluate and convert the analog inputs.

Discrete input sources 72 communicate signals or data (discrete inputs) regarding the electrical system 20 to the first control module 24 through the connector 52. The discrete inputs 72 include, for example, pilot switches, electrical system 20 components, and other first control modules 24. The discrete input sources 72 communicate signals such as, for example, information that indicates that a different generator or controller has malfunctioned, or suffered a fault condition. The signals from the discrete input sources 72 are filtered and scaled by the discrete input filter 62 and communicated to the main GBCM processor 64. Although certain discrete input sources 72 and analog devices 70 are described, additional discrete input sources 72 and analog devices 70 are contemplated.

The main GBCM processor 64 receives the converted analog inputs and discrete inputs and, after processing these inputs, provides a number of outputs 66 through the connector 52 of the first control module 26. The main GBCM processor 64 may provide other outputs of the first control module 26 independent of the processing of the inputs as well. The outputs 66 include, for example, activation of aircraft 10 systems, such as lights and actuators, opening and closing contactors, providing commands and signals to the second control module 26 or the generator 22, providing commands and signals to power buses 32, communicating with other first control modules 24 associated with different generators 22, and providing signals to the generator line control 28 and the generator control relay 30 (as shown in FIG. 2). Other outputs 66 are contemplated. Thus, the single, main GBCM processor 64 is operable to control, monitor, and verify the generator 22 and power bus 32 operations.

The main GBCM processor 64, for example only, may be any type of known microprocessor having desired performance characteristics. The first control module 24 may, for example only, include UVPROM, EEPROM, FLASH, RAM, ROM, DVD, CD, a hard drive, or other computer readable medium (not shown) which may store data and operation commands of the first control module 24 of this disclosure.

In one example, the first control module 24 includes a test link 74 in communication with the main GBCM processor 64. Test link 74 communicates with an external device 76 during manufacturing, prior to installation, and after installation, but before operation to test the functionality of the first control module 24, as well as software used in the main GBCM processor 64.

Figure 5:
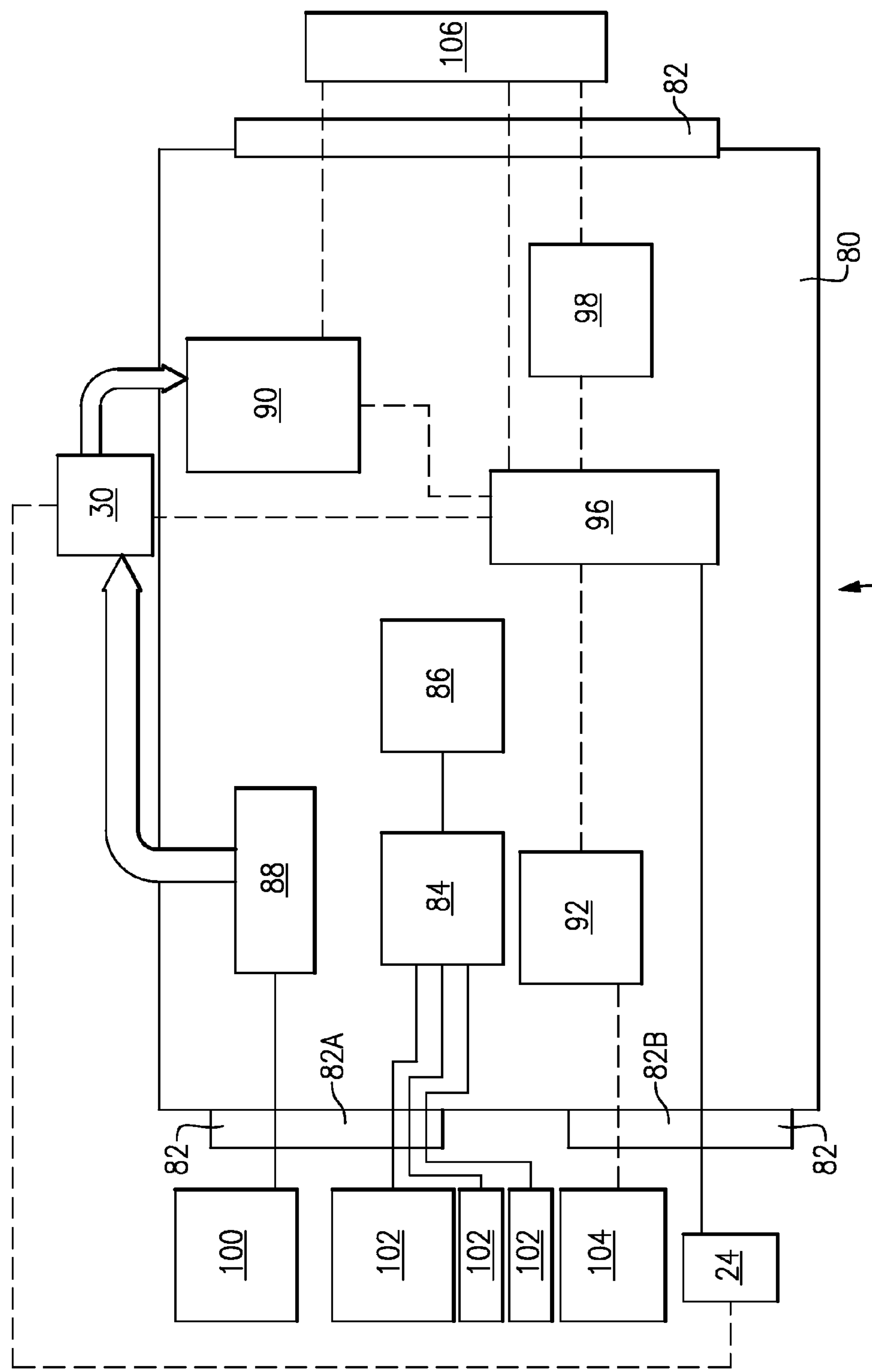
FIG. 5 illustrates a schematic view of an example second control module.

Referring to FIG. 5, with continued reference to FIG. 2, an example second control module 26, shown schematically, includes a printed wire board 80 and connectors 82, a diode-OR circuit 84 in communication with an integrated power system ("IPS") 86, an rectifier 88 in communication with an exciter drive 90, and an analog input filter 92 in communication with a VR processor 96. The VR processor 96 in communication with first control module 24, the exciter drive 90, and a generator line control drive 98.

An auxiliary power source 100 is connected to the second control module 26 through the connector 82 to provide power to the rectifier 88. In one example, auxiliary power source 100 is a permanent magnet generator or the like. The rectifier 88 is arranged to communicate power to the exciter drive 90. The exciter drive 90 increases or decreases in power to regulate the generator 22 by providing different excitation levels to the exciter field of the generator 22, resulting in different power level outputs from the generator 22.

In this example, at least one DC source 102 provides a DC input to power the second control module 26. The at least one DC source 102 is connected to the diode-OR circuit 84 through the connector 82 and provides voltage to the diode-OR circuit 84, which then processes and generates an output. This output is then communicated to the IPS 86 to power the IPS 86. When the auxiliary power source 100 fails, or is turned off, the at least one DC source 102 is able to provide enough power to the second control module 26 to test the second control module 26 and perform logic functions. In one example, each of the at least one DC sources 102 provides a 28V input.

In one example, the exciter drive 90 is powered only by auxiliary power source 100 and the rest of the second control module 26 is powered only by the at least one DC source 102.

A plurality of analog devices 104 provides analog inputs to the analog input filter 92 of the second control module 26 through the connector 82. The plurality of analog devices 104 provide analog inputs that can include measurements of various parameters monitored and sampled by the second control module 26 at different locations in the electrical system 20. For example, the analog inputs include measurements of frequency, generator speed, temperature, voltage, or other parameters of the electrical system 20 and generator 22.

The analog input filter 92 filters and scales the analog inputs, and communicates the analog inputs to the VR processor 96. The VR processor 96 evaluates and converts the analog inputs to digital inputs.

The VR processor 96 processes the converted analog inputs and provides certain outputs 106 through the connector 82 of the second control module 26. The outputs 106 include, for example, opening and closing contactors, providing commands and signals to the first control module 24 or the generator 22, and communications with the generator line control 28 and the generator control relay 30 (as shown in FIG. 2). The VR processor 96 communicates with the exciter drive 90 in response to the analog inputs to increase or decrease the power in the exciter drive 90 and thereby regulate the generator 22. In one example, the second control module's 26 regulation of the generator 22 includes increasing or decreasing the power in the exciter drive 90 in response to detecting a fault condition, a measurement of a voltage, frequency, or current output of the generator 22, or a short circuit detected in the aircraft 10.

The VR processor 96, for example only, may be any type of known microprocessor or digital signal processor having desired performance characteristics. The second control module 26 may, for example only, include UVPROM, EEPROM, FLASH, RAM, ROM, DVD, CD, a hard drive, or other computer readable medium (not shown) which may store data and operation commands of the second control module 26 of this disclosure.

The VR processor 96 communicates with the generator control relay 30, as described above. The VR processor 96 also communicates with the generator line control drive 98 to provide an ON or OFF state signal to the generator line control 28. The VR processor 96 communicates with the first control module 24 to both provide and receive information and commands. In one example, when the VR processor 96 is unable to receive analog inputs, the first control module 24 provides the necessary system parameters to the VR processor 96 to control the exciter drive 90.

In this example, the generator control relay 30 is separate from, and in communication with, the second control module 26. The generator control relay 30 is in communication with both the VR processor 96 of the second control module 26 and the main GBCM processor 64 of the first control module 24. In this example, the generator control relay 30 is arranged between the rectifier 88 and the exciter drive 90. The generator control relay 30 allows power to pass from the rectifier 88 to the exciter drive 90. Either of the first control module 24 or the second control module 26 can command the generator control relay 30 to prevent the rectifier 88 from providing power to the exciter drive 90. The generator control relay 30 provides an additional mechanism to isolate the generator 22 from the electrical system 20 in response to detecting a fault condition in the electrical system 20, or a failure of the first control module 24 or the second control module 26. Alternatively, the generator control relay 30 can be arranged between the exciter drive 90 and the generator 22, and the generator 22 can be selectively isolated by preventing the exciter drive 90 from powering the excitation field of the generator 22, as shown in further detail in FIG. 6.

In one example, the inputs provided to the second control module 26 by the auxiliary power source 100 and the DC source 102 pass through a first connector 82A and the inputs provided to the second control module 26 from the first control module 24 and analog devices 104 pass through a second connector 82B. The first connector 82A and the second connector 82B are physically separate from one another. The first connector 82A generally handles high power inputs relative to second connector 82B which handles lower power inputs. In another example, only one connector 82 for inputs is used.

Figure 6:
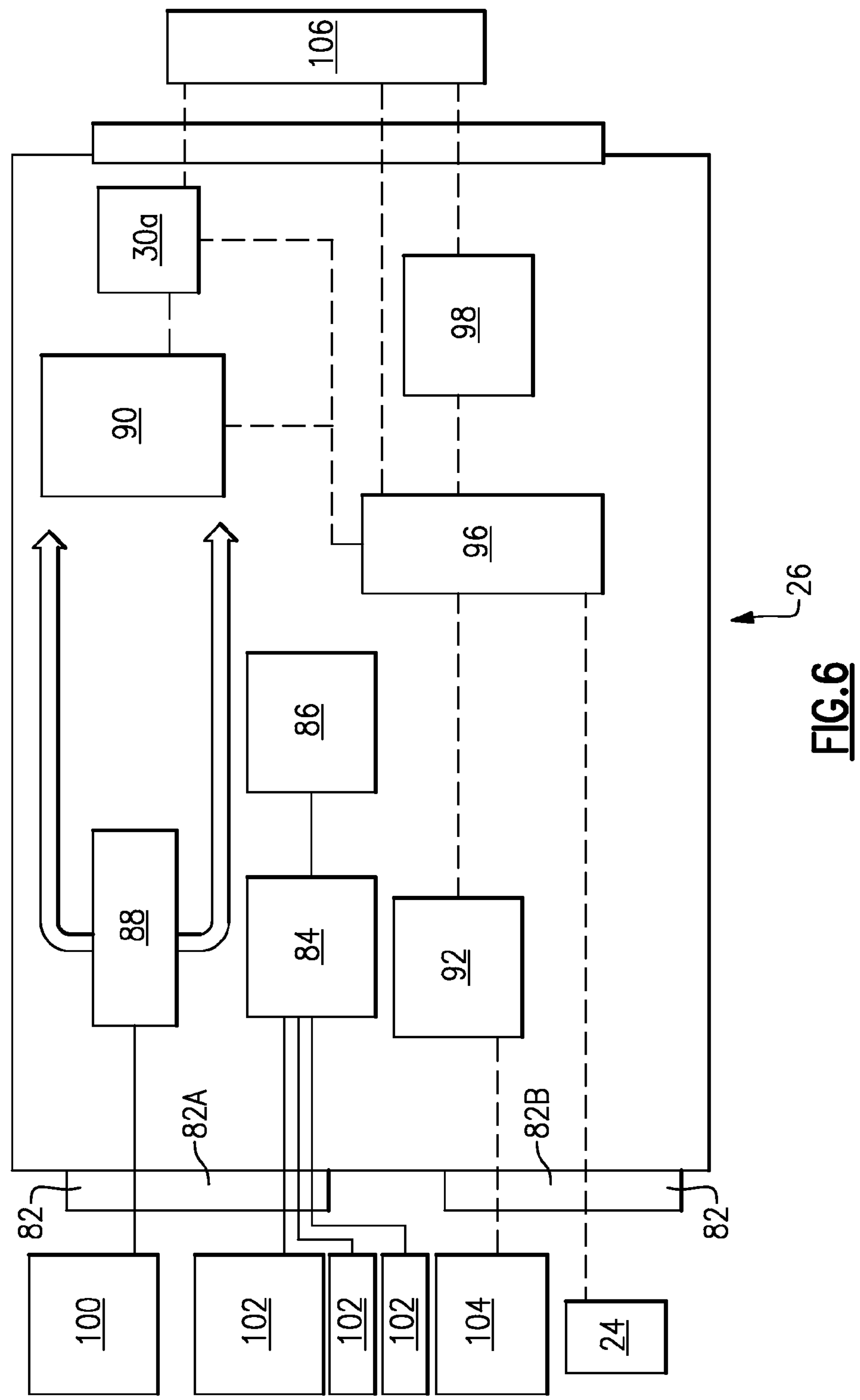
FIG. 6 illustrates another schematic view of an example second control module.

Referring to FIG. 6, with continued reference to FIG. 5, another example second control module 26 is shown. Second control module 26 of FIG. 6 includes the same features as FIG. 5, except as described herein. Discussion of like features is therefore omitted. A generator control relay **30*a* is disposed in the second control module 26. The generator control relay 30*a* is in communication with the VR processor 96 of the second control module 26. In this example, the generator control relay 30 is arranged between the exciter drive 90 and the generator 22. The generator control relay 30*a* provides an additional mechanism to isolate the generator 22 from the electrical system 20 in response to detecting a fault condition in the electrical system 20, or a failure of the first control module 24. Alternatively, the generator control relay 30*a* could be arranged between the exciter drive 90 and the rectifier 88 in the second control module 26. In this example, the first control module 24 is not in communication with the generator control relay 30*a*. However, in another example, the first control module communicates with and controls the generator control relay 30*a***.

Figure 7:
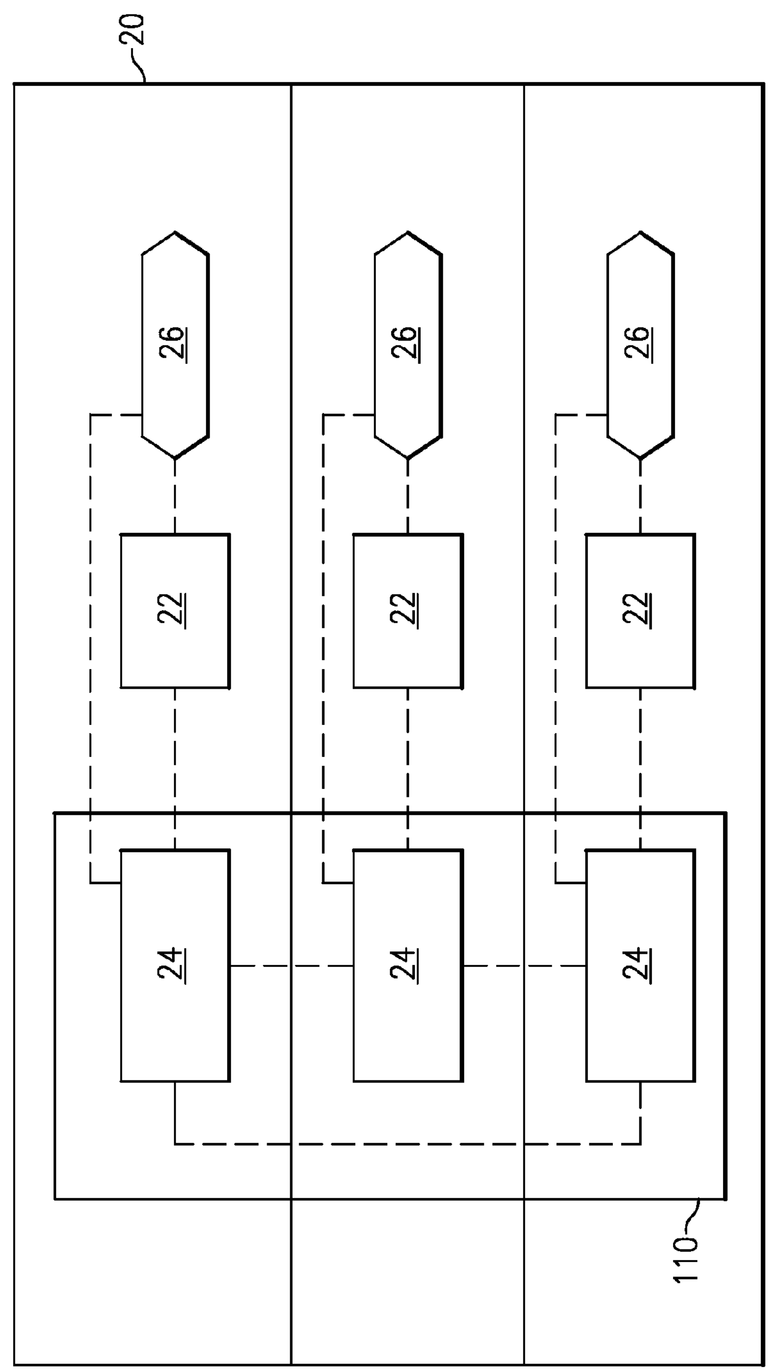
FIG. 7 illustrates a schematic view of an example electrical system with a plurality of first control modules and second control modules.

As shown in FIG. 7, an example electrical system 20 includes a plurality of generators 22, a plurality of first control modules 24, and a plurality of second control modules 26. In this example, three generators 22 are shown, each with a corresponding first control module 24 and the second control module 26. However, other numbers of generators 22, first control modules 24, and the second control modules 26 can be utilized. Multiple generators 22, each with corresponding first control modules 24 and the second control modules 26, are provided in electrical system 20 to provide physical redundancy in the event of a failure of any of the generators 22, the first control modules 24 or the second control modules 26. The first control modules 24 are in communication with each other to monitor the generators 22, and adjust the electrical system's 20 power distribution and data distribution in response to detecting a fault condition or malfunction. In one example, the plurality of first control modules 24 are arranged and stored in a single panel 110 of the fuselage of the aircraft 10. In accordance with the above features, the example electrical system 20 will include two primary processors per controller 21 associated with each generator 22, one in the first control module 24 and one in the second control module 26.

Although the different examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. An aircraft electrical system comprising:

a generator coupled with a gas turbine engine;

a controller operable to distribute power of the generator, the controller including, a first control module positioned at a first location remote from the generator on an aircraft, the first control module being configured to verify at least one output of the generator meets a requirement of the aircraft, detect a fault condition of the generator, and control operation of at least one power bus in communication with the first control module by controlling an amount of power passing to the at least one power bus, wherein the at least one power bus is in communication with at least one load of at least one aircraft component, and a second control module positioned at a second location more proximate the generator than the first control module and configured to regulate the at least one output of the generator through a voltage regulator processor, wherein the at least one output of the generator includes a voltage; and a generator line control in communication with the first control module and the second control module, wherein the first control module is connected to a first terminal of the generator line control, and the second control module is connected to a second terminal of the generator line control, wherein the generator line control receives power from the generator, and wherein the generator line control is changed to an OFF state by receiving an OFF state signal at a corresponding terminal from either of the first control module and the second control module in response to the fault condition such that distribution of power from the generator to at least one load associated with the at least one power bus ceases.

2. The aircraft electrical system of claim 1, wherein the second control module includes an exciter drive powered by an auxiliary power source.

3. The aircraft electrical system of claim 1, wherein the first control module is in communication with the second control module and is operable to take the generator and the second control module offline in response to the fault condition by switching to an OFF state.

4. The aircraft electrical system of claim 1, further including a generator control relay in communication with the first control module and the second control module, wherein the generator control relay is configured to interrupt communication between an rectifier and an exciter drive of the second control module in response to a command from the first control module or the second control module.

5. The aircraft electrical system of claim 1, wherein the first control module and the second control module are each configured to electrically isolate the generator in response to the fault condition, wherein the fault condition includes at least one of an overvoltage condition, an undervoltage condition, an overfrequency condition, and an underfrequency condition.

6. The aircraft electrical system of claim 1, wherein the second control module is attached to the generator, or within the generator.

7. The aircraft electrical system of claim 1, wherein a processor of the second control module is in communication with an exciter drive of the second control module, wherein the second control module commands the exciter drive to increase or decrease excitation of the generator in response to the at least one output that is a voltage.

8. The aircraft electrical system of claim 7, wherein the processor commands the exciter drive to increase or decrease excitation of the generator in response to at least one output that is a current from the generator.

9. A method of operating an aircraft electrical system including the steps of:

providing a generator coupled with a gas turbine engine and a controller including a first control module and a second control module;

verifying an output of the generator meets an aircraft requirement with the first control module positioned at a first location on an aircraft, wherein the first control module is operable to detect a fault condition of the generator;

regulating the output of the generator with a second control module positioned at a second location more proximate the generator than the location, wherein the output includes a voltage and the regulating is performed with a voltage regulator processor;

controlling operation of at least one power bus with the first control module by controlling an amount of power passing to the at least one power bus, wherein the at least one power bus is in communication with at least one load of at least one aircraft component; and controlling operation of a generator line control in communication with the first control module and the second control module, wherein the first control module is connected to a first terminal of the generator line control, and the second control module is connected to a second terminal of the generator line control, wherein the controlling operation of the generator line control consists of changing the generator line control to an OFF state in response to receiving an OFF state signal at a corresponding terminal from either of the first control module and the second control module in response to the fault condition such that distribution of power from the generator to at least one load associated with the at least one power bus ceases.

10. The method of claim 9, further comprising communicating measurements of generator parameters to the first control module from the second control module; and taking the generator offline in response to a fault condition by switching at least one of the first and second control modules to an OFF state.

11. The method of claim 9, further comprising powering the exciter drive of the second control module with an auxiliary power source.

* * * * *